United States Patent [19]

McCarthy et al.

[11] Patent Number: 4,515,176
[45] Date of Patent: May 7, 1985

[54] SOLENOID OPERATED PRESSURE REGULATION

[75] Inventors: James P. McCarthy, Inkster; Richard E. Byler, Livonia, both of Mich.

[73] Assignee: Ford Motor Company, Dearborn, Mich.

[21] Appl. No.: 425,193

[22] PCT Filed: Aug. 4, 1982

[86] PCT No.: PCT/US82/01060
§ 371 Date: Aug. 4, 1982
§ 102(e) Date: Aug. 4, 1982

[87] PCT Pub. No.: WO84/00627
PCT Pub. Date: Feb. 16, 1984

[51] Int. Cl.³ .......................................... G05D 16/00
[52] U.S. Cl. ...................................... 137/115; 137/82
[58] Field of Search .................. 137/82, 85, 115, 506, 137/512.1

[56] References Cited

U.S. PATENT DOCUMENTS

| | | |
|---|---|---|
| 2,975,976 | 3/1961 | Smith .............................. 137/506 X |
| 3,099,995 | 8/1963 | Raufenbarth ........................ 137/82 |
| 3,602,069 | 8/1971 | Mori . |
| 3,604,288 | 9/1971 | Mori . |
| 3,667,322 | 6/1972 | Noguchi et al. . |
| 3,670,598 | 6/1972 | Mohri et al. . |
| 3,695,122 | 10/1972 | Irie et al. . |
| 3,710,651 | 1/1973 | Marumo et al. . |
| 3,748,926 | 7/1973 | Mohri et al. . |
| 3,799,001 | 3/1974 | Takagi et al. . |
| 3,855,880 | 12/1974 | Ishimaru et al. . |
| 4,283,970 | 8/1981 | Vukovich . |

FOREIGN PATENT DOCUMENTS

| | | | |
|---|---|---|---|
| 213676 | 7/1960 | Austria .................................. | 137/85 |
| 262501 | 5/1970 | U.S.S.R. ............................... | 137/85 |

*Primary Examiner*—Robert G. Nilson
*Attorney, Agent, or Firm*—Frank G. McKenzie; Donald J. Harrington

[57] ABSTRACT

A normally closed line pressure regulator valve has an orifice that is opened and closed as the coil of the solenoid is energized and deenergized. When the valve is opened, the pump outlet is opened to a vent port. A line pressure relief valve in parallel with the solenoid valve opens at a predetermined pressure when the solenoid valve is closed and establishes a maximum line pressure. Minimum line pressure is determined by the pressure drops across orifices located between the outlet of the pump and the vent port. Line pressure is regulated between the maximum and minimum values by energizing and deenergizing the solenoid coil.

7 Claims, 2 Drawing Figures

SOLENOID OPERATED PRESSURE REGULATION

BACKGROUND OF THE INVENTION

1. Field of the Invention

This invention relates to a hydraulic fluid line pressure regulator of the type used to regulate line pressure in an automatic transmission. More particularly, this invention relates to such a system controlled through actuation of a solenoid wherein the actual line pressure is controlled in an open loop system.

2. Description of the Prior Art

The line pressure in an automatic transmission is usually established by connecting the outlet of the hydraulic pump to a pressure regulator valve through which the regulated fluid is directed to selectively operated shift valves, which control the engagement of clutches and brake servos whose selective engagement produces the various speed ratios of which the transmission is capable. If line pressure is too high, the clutch elements engage too quickly producing abrupt and objectionable shifting. If line pressure is too low the clutch elements are engaged over a protracted period, which subjects the clutch elements to excessive wear and heat. Prior art transmissions of the hydraulically actuated type include hydraulic and pneumatic means for varying the line pressure, generally as a function of throttle position. Here it is proposed to regulate the line pressure with an electric solenoid that operates a line regulator valve. In this system, line pressure is varied between a minimum and maximum value according to the duty cycle of the solenoid. In the prior art the electrical solenoids used to regulate line pressure have been expensive precision variable force solenoids. The control systems in the prior art use a closed loop whereby information concerning the magnitude of variations in the regulator line pressure is sensed and applied as input in the form of an error signal.

SUMMARY OF THE INVENTION

It is an object of this invention to provide a line pressure regulator system for an automatic transmission that can be accurately controlled within maximum and minimum values through the operation of a solenoid that alternately opens and closes an orifice whose pressure drop determines the minimum line pressure. It is another object of this invention that the line pressure regulator should employ hydraulic components that are particularly adapted for use and control by an electronically operated solenoid. It is yet another object of this invention that the line pressure can be modulated accurately to the desired pressure using components that are not sensitive to adjustments, that accurately establish the minimum and maximum values and across which leakage of hydraulic fluid is not a significant factor. It is still a further object of this invention that the line pressure regulator system be relatively insensitive to variations in temperature.

In realizing these and other objects this invention provides a first orifice which is biased closed by a spring that urges a ball or needle valve element into a seated position on the orifice seat. When the coil of the solenoid is energized, the valve element is moved against the spring force away from the orifice seat thereby opening the pump outlet to a vent port. A second branch of the regulator in parallel with the first orifice furnishes a pressure relief valve that opens the pump outlet to vent if the line pressure rises to a predetermined value. Another orifice in series with the parallel brances of the solenoid valve and relief valve has a fixed size and therefore provides a fixed pressure drop. The maximum line pressure is established while the first orifice is closed at the pressure at which the relief valve opens. The minimum line pressure is determined while the first orifice is open by the pressure drop across the first and second orifices.

In a second embodiment, the first orifice is similarly opened and closed according to energizing signals applied to and removed from the coil of the solenoid. The first orifice communicates the outlet of the pump to a vent port. A second branch, in parallel with the solenoid-operated valve, furnishes a second orifice having a fixed size and a predetermined pressure drop. In series with the parallel branches and located between these branches and the outlet of the pump is a third orifice having a fixed dimension providing a predetermined pressure drop thereacross. Maximum line pressure is determined with the first orifice closed by the pressure drop across the second and third orifices. The minimum line pressure is established with the first orifice open by the pressure drop across the first and third orifices. Further control of the minimum line pressure is available by inserting a fourth fixed dimension orifice in series with the first orifice, which is the solenoid regulated valve. In this instance the minimum line pressure is determined by the pressure drop across the first, third and fourth orifices.

DESCRIPTION OF THE PREFERRED EMBODIMENT

Figure 1:
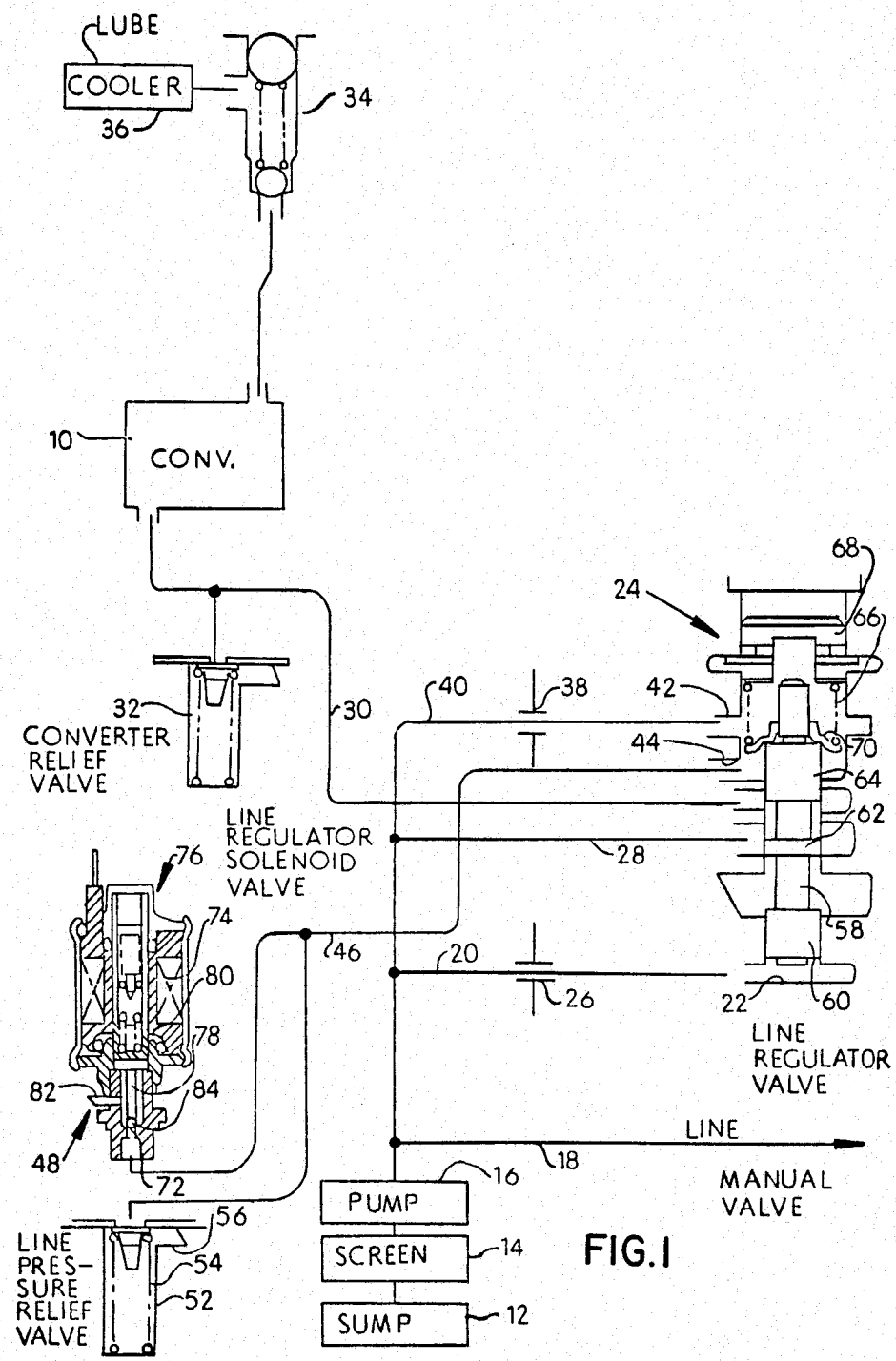
FIG. 1 is a schematic diagram of the line pressure regulator system according to this invention that employs a line pressure relief valve.

Referring to FIG. 1, the transmission is supplied with enough fluid to keep the torque converter 10 completely filled, to operate the hydraulic controls, to lubricate the working parts and to provide a reserve of fluid in the sump 12, a storage space in the oil pan at the bottom of the transmission case. Atmospheric pressure in the sump forces fluid through the sump screen 14 and into the evacuated inlet of the pump 16. Fluid delivered by the pump is displaced at a volumetric rate that is in proportion to the speed at which the pump is driven. The pump is sized to deliver more fluid than the transmission needs and excess hydraulic fluid is recirculated to the sump by the pressure regulator system and other portions of the hydraulic control system.

The output of the pump connected by hydraulic line 18 supplies regulated line pressure to the manual valve (not shown). The pump outlet is connected through line 20 to the control chamber 22 of a main regulator valve 24. The orifice 26 in line 20 produces no appreciable pressure drop across it except when flow in line 20 reverses direction at high frequency.

The pump outlet supplies hydraulic fluid through line 28 to the central chamber of valve 24. The torque converter circuit is charged or pressurized through line 30 that leads from regulator valve 24. The converter circuit includes relief valve 32 which is adapted to open the circuit to the pump inlet at approximately 125 psi. as necessary to protect the converter from excessive pressure buildup. Upon leaving the converter, hydraulic fluid passes through a check valve 34 having a light spring that opens with low pressure to maintain continuous fluid flow to the cooler 36. When the engine is shut down, the spring will reseat the valve. This prevents the converter oil from draining through the cooler and lubrication system back to sump. Therefore, the converter is maintained full of fluid and can begin to transmit torque through the turbine shaft as soon as the engine is started.

The pump outlet is also connected through orifice 38 in line 40 to inlet port 42 in which is produced a range of main control pressure depending upon the gear ratio selected and the difference between the main control pressure and the requirements of the system. An outlet port 44 of the regulator valve is connected through line 46 to a line pressure regulator solenoid valve 48 and to a line pressure relief valve 52. The force of spring 54 maintains relief valve 52 closed, but if the pressure force on the face of the valve element exceeds the force of the spring, line 46 is opened to the vent port 56.

Regulator valve 24 has a central chamber within which valve spool 58 moves due to the effect of pressure forces applied to the outer ends of lands 60 and 64 and the force of spring 66, which biases spool 58 downward. The opposite end of the valve chamber from that of the control port 22 is blocked by a plug element 68 against which spring 66 bears. Spring 66 is retained between plug 68 and a cup element 70, which is retained in contact with spool 58 through the force of spring 66.

The pressure regulator system operates to control the pressure in line 18. In order to fill the lines of the hydraulic system, regulator valve 24 is moved by spring 66 to the lower end of the valve chamber. The pump is driven by the engine and the lines are filled at low pressure. As pressure begins to rise, spool 58 is forced upward against spring 66 to approximately the position shown in FIG. 1 permitting land 64 to open communication between lines 28 and 30, whereby the converter circuit and hydraulic control system are fully charged.

Regulation of line pressure results upon opening and closing orifice 72 of the solenoid valve 48 as the coil 74 of the solenoid 76 is energized and deenergized. Normally valve 48 is closed and coil 74 is deenergized. Valve 48 includes an impact pin 78, which is biased downward by spring 80 into contact with valve seat 72 when the coil of the solenoid is not energized. On the opposite side of orifice 72 from that of regulator valve 24, valve 48 provides a vent port 82. When the coil of the solenoid is energized, pin 78 is withdrawn and ball 84 is moved by operation of the pressure in line 46 away from orifice 72 thereby opening communication between line 46 and the vent port 82. The maximum line pressure is determined with the solenoid deenergized as the pressure in line 46 at which line pressure relief valve 52 opens. Minimum line pressure regulation is determined with the solenoid energized thus opening the pump outlet to vent port 82 through orifices 38 and 72. The minimum line pressure is determined by the pressure drops across orifices 38 and 72. If the diameter of orifice 72 is 0.038 inches and the diameter of orifice 38 is 0.030 inches, the minimum line pressure will be approximately 60 psi. Generally, there is no flow into and out of control chamber 22; hence there is no pressure drop across orifice 26 whose presence in the circuit prevents unstable oscillations of valve 24.

Figure 2:
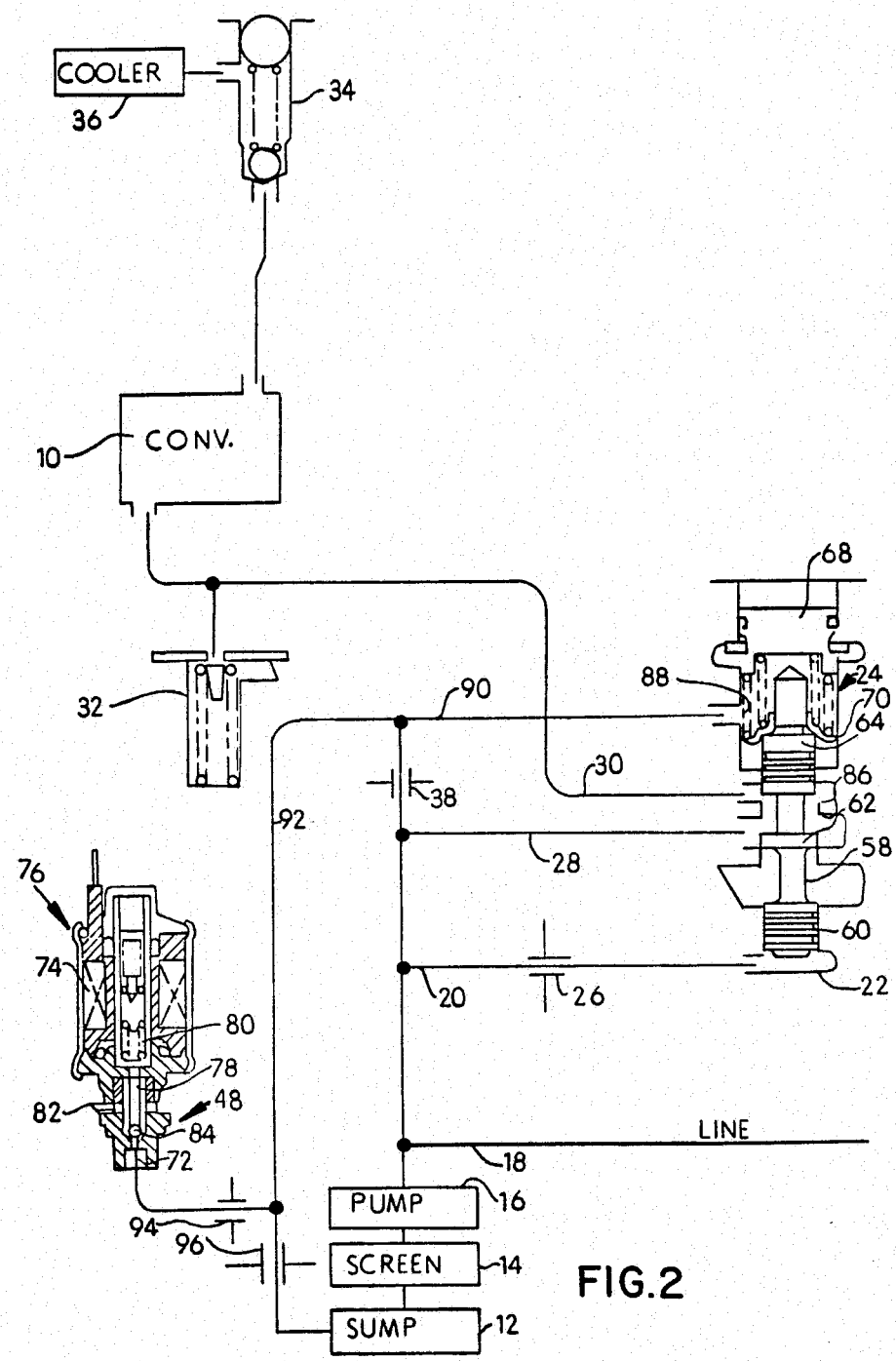
FIG. 2 is a schematic diagram of a line pressure regulator system according to this invention employing several orifices whose associated pressure drops establish the maximum or minimum line pressure in combination with the cyclic operation of the solenoid valve.

Refer now to FIG. 2 wherein identical identifying numbers are used to indicate identical portions of the system as those used in FIG. 1. The pump supplies pressurized fluid to the manual valve through line 18. Line 20 pressurizes control chamber 22 of the regulator valve 24, line 28 supplies fluid to converter chamber 86, and line 90 connects the pump outlet to chamber 88 downstream of orifice 38. Line 92 communicates the pump outlet with orifice 72 of the solenoid operated line regulator valve 48 downstream of orifices 38 and 94. A bleed orifice 96 is located in the line that connects line 92 to the sump 12. The pressure drop across bleed orifice 96 establishes the maximum line pressure when the solenoid is deenergized, i.e., when ball 84 closes communication between orifice 72 and vent port 82.

When regulator valve 48 is closed by the force of spring 80 and solenoid 76 is deenergized, fluid supplied by the pump experiences pressure drops in flowing through orifices 38 and 96. By suitably selecting the diameters of orifices 38, 96, the maximum pressure in line 18 is established. For example, with the diameter of orifice 38 set at 0.030 inches and the diameter of the bleed orifice 96 set at 0.021 inches, the maximum line pressure is about 270 psi. Minimum line pressure is determined while solenoid 76 is energized by the pressure drops across orifices 38, 72, 94 and 96. When solenoid 76 opens valve 48, a minimum line pressure of 60 psi. results if the diameter of orifice 72 is 0.050 inches, that of orifice 94 is 0.042 inches and orifice 38 is 0.030 inches. Line pressure between the minimum and maximum values is produced by energizing and deenergizing the coils of solenoid 76. When valve 48 is opened, the pressure in line 92 drops and the line pressure is reduced. Opening valve 48 also reduces the pressure in line 90 and in boost chamber 88, thereby reducing the pressure force applied to spool 58 of regulator valve 24.

When the boost chamber pressure is reduced, land 64 opens communication between lines 28 and 30 at a lower line pressure, thereby reducing the pressure of fluid delivered to the converter circuit. When valve 48 is closed, the pressure in boost chamber 88 increases to a value that is less than line pressure by the amount of the pressure drop across orifice 38. This applies a greater force to spool 58, thereby increasing the line pressure that is required to open communication between lines 28 and 30.

Having described the preferred embodiment of our invention, what we claim and desire to secure by U.S. Letters Patent is:

1. A line pressure regulation system for regulating fluid pressure in a hydraulic line comprising:
    a source of pressurized fluid connected to the hydraulic line;
    an orifice communicating with the outlet of the fluid pressure source having a predetermined pressure drop thereacross, the orifice being normally closed, the outlet of the pressure source being opened to vent when the orifice is opened;
    a second orifice of fixed size in parallel with the first orifice across which the outlet of the pressure source is communicated to vent; and
    an electrical solenoid adapted to open and close the first orifice.

2. The system of claim 1 wherein the solenoid is energized to open the first orifice thereby reducing the line pressure toward a minimum value determined by the pressure drop across the orifices.

3. The system of claim 2 further comprising a third orifice in series with the first and second orifices having a fixed size, located between the hydraulic line in which pressure is being regulated and the first and second orifices, wherein the solenoid is energized to open the first orifice thereby reducing the line pressure toward a minimum value determined by the pressure drop across the first and third orifices.

4. The system of claim 3 further comprising a fourth orifice in series with the first orifice located between the third orifice and the first orifice and wherein the solenoid is energized to open the first orifice thereby reducing line pressure toward a maximum value determined by the pressure drop across the orifices.

5. The system of claim 1 wherein line pressure rises, with the first orifice closed, toward a maximum value determined by the pressure drop across orifices.

6. A line pressure regulation system for regulating fluid pressure in a hydraulic line comprisng:
- a source of pressurized fluid connected to the hydraulic line;
- a first orifice communicating with the outlet of the fluid pressure source having a predetermined pressure drop thereacross, the orifice being normally closed, the outlet of the pressure source being opened to vent when the orifice is opened;
- a pressure relief valve in parallel with the first orifice communicating with the outlet of the fluid pressure source, adapted to open said source to vent if the line pressure exceeds a predetermined magnitude;
- an electrical solenoid adapted to open and close the first orifice; and
- a second orifice having a predetermined pressure drop thereacross located between the hydraulic line in which the pressure is being regulated and the first orifice, wherein the solenoid is energized to open the first orifice, thereby reducing the line pressure toward a minimum value determined by the pressure drop across the first and second orifices.

7. The system of claim 6 wherein line pressure rises, with the first orifice closed, toward a maximum value determined by the pressure at which the pressure relief valve opens.

* * * * *